United States Patent [19]

Samudrala et al.

[11] Patent Number: 4,849,923
[45] Date of Patent: Jul. 18, 1989

[54] APPARATUS AND METHOD FOR EXECUTION OF FLOATING POINT OPERATIONS

[75] Inventors: Sridhar Samudrala, North Grafton; Victor Peng, Shrewsbury; Nachum M. Gavrielov, Ashland, all of Mass.

[73] Assignee: Digital Equipment Corporation, Maynard, Mass.

[21] Appl. No.: 879,337

[22] Filed: Jun. 27, 1986

[51] Int. Cl.[4] .............................................. G06F 7/38
[52] U.S. Cl. .................................................. 364/748
[58] Field of Search ............... 364/748, 745, 757, 788, 364/768

[56] References Cited

U.S. PATENT DOCUMENTS

| | | | |
|---|---|---|---|
| 3,557,355 | 1/1971 | Porter | 364/757 |
| 3,891,837 | 6/1975 | Sunstein | 364/745 |
| 4,682,303 | 7/1987 | Uya | 364/788 |

FOREIGN PATENT DOCUMENTS

| | | | |
|---|---|---|---|
| 108050 | 8/1980 | Japan | 364/748 |
| 0099540 | 6/1984 | Japan | 364/748 |
| 0235239 | 11/1985 | Japan | 364/748 |
| 0235241 | 11/1985 | Japan | 364/748 |

OTHER PUBLICATIONS

Earle et al., Exponent Differences and Preshifter, IBM Technical Disclosure Bulletin, vol. 9, No. 7, Dec. 1966.

*Primary Examiner*—Gary V. Harkcom
*Assistant Examiner*—Long Thang Nguyen
*Attorney, Agent, or Firm*—William W. Holloway; William C. Cray

[57] ABSTRACT

In a floating point arithmetic execution unit, an additional adder unit and a selection network are added to the apparatus typically performing the arithmetic floating point function. The additional apparatus permits certain processes forming part of arithmetic operations to be executed in parallel. For selected arithmetic operations, the final result can be one of two values typically related by an intermediate shifting operation. By performing the processes in parallel and selecting the appropriate result, the execution time can be reduced when compared to the execution of the process in a serial implementation. The fundamental arithmetic operations of addition, subtraction, multiplication and division can each have the execution time decreased using the disclosed additional apparatus.

20 Claims, 7 Drawing Sheets

APPARATUS AND METHOD FOR EXECUTION OF FLOATING POINT OPERATIONS

BACKGROUND OF THE INVENTION

1. Field of the Invention

This invention relates generally to data processing systems and, more particularly, to apparatus in the central processing unit that performs the manipulation of the data signal groups determined by the instruction sequence generally referred to as floating point operations.

2. Description of the Related Art

In the modern data processing system, groups of data signals can be chosen to represent the sign (+), the fraction or numeric value (A,B), and the position of the binary point of a numeric value ($E_A$, $E_B$). This representation is referred to as a floating point representation of a numeric quantity. (According to convention, the floating point fraction field is normalized to provide a non-zero quantity in the most significant bit position of the fraction field.) The floating point representation of a numeric quantity has the advantage that a wide range of values can be accommodated with the same degree of accuracy. However, the manipulation of the floating point quantities, because of the structure of the representation of a number, is slower than manipulation of the typical representation of numeric quantities in which the binary point has a predefined location.

Referring to FIG. 1, the selected components of a typical data processing system are shown. The data processing system generally includes a central processing unit 10 wherein the manipulation of data signal groups according to instruction sequences or programs are performed, a main memory unit 12 wherein the software programs (and associated tables) utilized by the central processing unit is stored, and at least one interface unit 11 that provides secondary storage for data and program signal groups and permits communication by the central processing unit with external devices. The central processing unit 10 includes an instruction unit 13 that responds to instruction signal groups by enabling predetermined apparatus in the proper sequence for performing the activity defined by the instruction. In particular, the instruction unit 13 controls the execution unit 14 which performs the operations, on data signal groups applied thereto, defined by the instruction signal groups. In the execution unit 14, an arithmetic unit 15 typically performs the arithmetic operations defined by the instruction signal group. Where feasible, a separate floating point arithmetic unit 16 is included. A separate floating point arithmetic unit is utilized because the floating point arithmetic operation execution time is relatively lengthy and requires special circuit configurations. The present invention relates to the floating point arithmetic unit.

Addition and Subtraction

Considering first the addition and subtraction operations, a flow chart for these operations according to the related art is shown in FIG. 2. In step 200, the determination is made as to whether the required floating point operation is an effective add or an effective subtract operation. When the macro operation is an addition operation and the signs of the two quantities to be added are the same or when the macro operation is a subtraction operation and the signs of the two quantities to be subtracted are different, the operation is considered an effective add operation and the sequence beginning with step 210 is executed. When the requested macro operation is addition operation and the signs of the two quantities to be added are different or when the macro operation is subtraction operation and the signs of the two quantities to be subtracted are the same, the operation is an effective subtract operation and the sequence beginning with step 220 is executed. In the sequence beginning with step 210, the exponents of the two quantities are compared and the difference between the exponents, DELTA E, is determined in step 211. In step 212, the fraction having the smaller exponent is moved to the right by the number of positions DELTA E determined in the previous step, the procedure aligning the fraction of the two quantities A and B. (In the remainder of this discussion, the quantities A and B will be used to denote aligned fractions.) In step 213, the fractions A and B are added and, in step 214, a shift to the right of the resulting fraction is performed when an overflow is detected as a result of the process. In step 215, a rounding operation is performed when necessary. It will be clear to those skilled in the art that step 211, the determination of the exponential DELTA E, step 212, the alignment of the fractions, step 213, the addition of the fractions, and step 215, the rounding step, involve potentially time consuming operations by the floating point arithmetic unit. An effective add operation is illustrated in Table 1A.

TABLE IA (Example of an Effective Add Operation)

| | | |
|---|---|---|
| A = 0.10001 | $E_A$ = N | Aligned operand |
| B = 0.10000 | $E_B$ = N | Aligned operand |
| R = 1.00001 | $E_R$ = N | Sum before normalization |
| R = 0.100001 | $E_R$ = N + 1 | Sum after normalization |
| 0.000001 | | Rounding constant |
| R = 0.10001 | $E_R$ = N + 1 | Final result after rounding |

Referring once again to FIG. 2, the effective subtract operation, indicated by step 220 begins with step 221, determination of DELTA E, the difference between the exponents of the two quantities. In step 222, the fractions are aligned by shifting the fraction with the smaller exponent to the right by DELTA E positions, DELTA E having been determined in the previous step. The aligned fractions are then subtracted in step 223. In step 224, when the result of the subtraction is a negative quantity, the 2's complement of the value determined in step 223 is computed. In step 225, the position of the leading 1 is detected and, in step 226, the fraction is normalized and the exponent value corrected for the normalization. In step 227, the fraction is rounded off, if necessary. It will be clear to those familiar with floating point operations that all the steps, 221 through 227, can require a relatively lengthy period for execution.

Multiplication

The floating point multiplication operation can be understood by the processes implemented for the fields of the quantities to be multiplied.

$S_R = S_1 \text{ XOR } S_2$ $E_R = E_1 + E_2$ $F_R = F_1 * F_2$ where S is the sign field, E is the field of the argument of the exponent and F is the fraction field. The multiplication operation has a relatively simple process flow. The major time consuming step portion of the operation is the multiplication of the two fractions. In most applications, the multiplication of the two fractions is expedited by using a large array of adder circuits. One of the most frequently used techniques to perform the fraction multiplication is to couple the adder circuits in a carry-save configuration and eliminate the carry propagation times. One consequence of using a carry-save configuration is that the result consists of a redundant form and is comprised of two vectors. These vectors are called the final Sum and Carry vectors, and a carry propagation addition is required at the end of the array in order to change the result to a standard format. This standard format result may not be normalized, in which case a shifting process must be performed in which the fraction quantity is shifted one position prior to a final rounding step. The final rounding step is implemented by adding a one to the standard format result and may require a carry propagation addition. The flow of the fraction processing is indicated in FIG. 3. In step 301, the core operation of multiplying the fractions using the carry-save adder configuration is implemented. In step 302, the final Sum and Carry vectors determined by the carry-save adder configuration are added. The resulting sum is normalized, when necessary, in step 303. And finally, in step 304, a rounding process is performed. This rounding process is implemented by adding a carry in bit to the previous result at the round position, i.e. one bit position lower than the least significant bit position. The operation has two potentially time consuming operations in addition to the core multiplication step 301: the adding step 302 and the rounding step 304. These steps may each require a full carry propagation addition and are performed in series, thus adding two lengthy operations to the overall execution time.

Division

The floating point division operation can be understood by the following processes on the fields of the quantities to be divided.

$$S_R = S_1 \; XOR \; S_2$$

$$E_R = E_1 - E_2$$

$$F_R = F_1/F_2$$

where S is the sign field, E is the field of the argument of the exponent and F is the fraction field. The floating point operation of division has a relatively simple flow. The major time consuming process is finding the quotient of the two fractions. One frequently used algorithm in implementing the determination of the quotient is the "non-restoring" division. This algorithm requires performing a series of subtractions and additions depending on whether a partial remainder is positive or negative. This core operation is followed by a plurality of terminal operations. The first terminal operation is the determination of the difference between the number of ordinary subtract steps, designated as $N_S$ and the number of negative subtract steps, designated $N_A$. Additional process steps that are required include possible normalization of the result, rounding, and the possible rounding induced denormalization. Referring to FIG. 4, the steps in the floating point division operation are illustrated. In step 401, the core operation in the floating point division operation, i.e. the division of the fractions, is implemented while computing $N_S$ and $N_A$. In step 402, the difference $N_S - N_A$, which defines the effective number of subtractions that were performed, is determined. The result is normalized, if necessary, in step 403. The maximum shift required for this normalization is one bit position. In step 404, the resulting fraction is rounded. It will be clear to those skilled in the art that, in addition to the core procedure of step 401, steps 402 and 404 may require full carry propagation addition and, by being performed in series, add two potentially lengthy procedures to the execution time.

FEATURES OF THE INVENTION

It is an object of the present invention to provide an improved data processing system.

It is another feature of the present invention to provide an improved central processing unit for a data processing unit.

It is yet another feature of the present invention to provide an improved execution unit for a data processing system.

It is still another feature of the present invention to provide improved apparatus and method for execution of floating point operations in a data processing system.

It is a more particular feature of the present invention to provide a method and apparatus for improved execution of the basic floating point arithmetic operations by parallel execution of certain procedures.

SUMMARY OF THE INVENTION

The aforementioned and other features are obtained, according to the present invention, by providing an additional adder circuit or unit to be operated in parallel with an adder circuit of the floating point arithmetic unit. In addition, a selector circuit is included to select which adder circuit has the correct computational result. In the flow charts of the typical floating point arithmetic operation, the operation sequence appears to require a previous result before certain procedures (e.g. the rounding procedure) can be implemented. However, a more careful analysis indicates that this linear flow diagram results in only two possible results. The second adder circuit, which along with the original adder circuit can combine the rounding constant to an addition or subtraction process, permits the two possible results of the operation to be determined in parallel. The selector circuit receives signals that indicate which adder has the correct resulting value, typically based on a presence of an overflow bit. Each of the arithmetic operations, the addition operation, the subtraction operation, the multiplication operation or the division operation, can have an increased execution speed as a result of the parallel processing capability.

These and other features of the present invention will be understood upon reading of the following description along with the drawings.

DESCRIPTION OF THE PREFERRED EMBODIMENT

1. Detailed Description of the FIGS.

Figure 5:
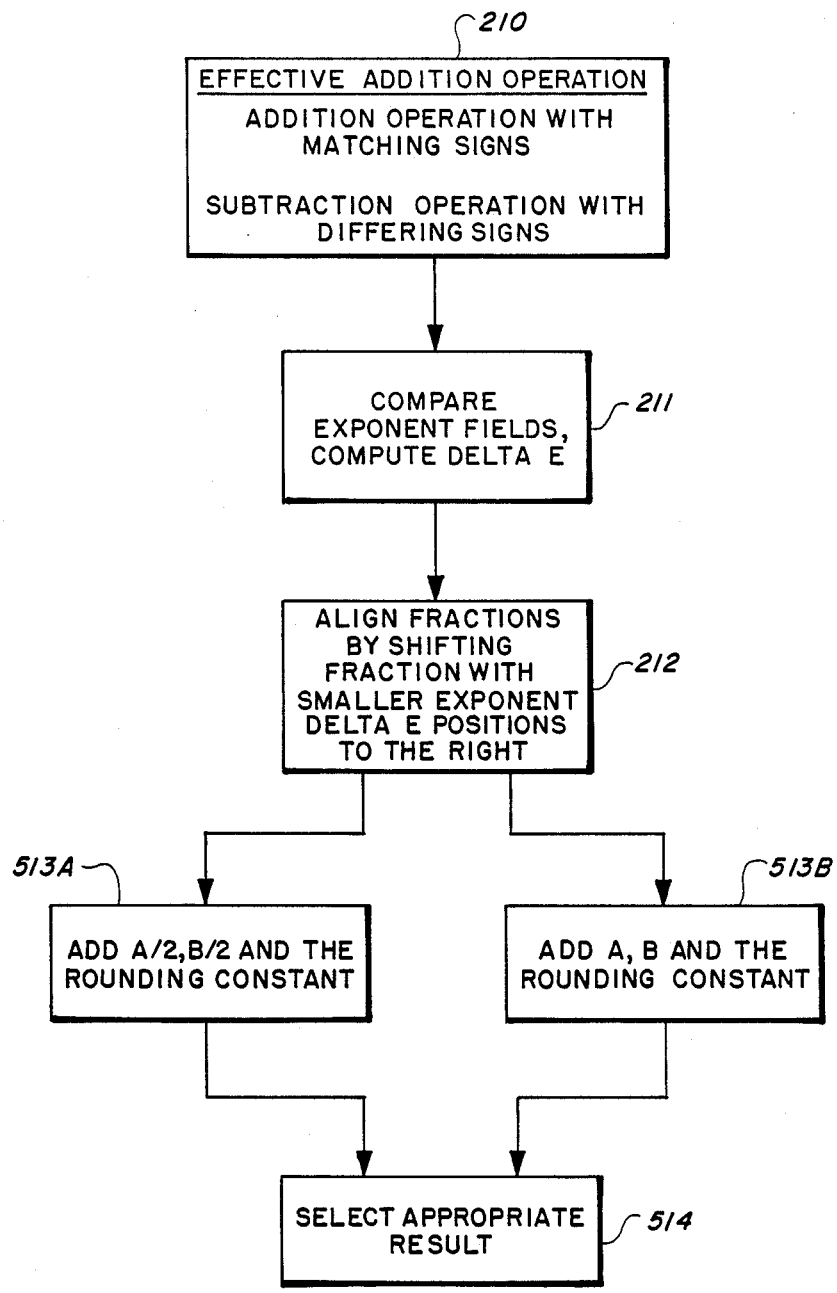
FIG. 5 is a flow diagram of the execution of a floating point effective add operation according to the present invention.

Referring now to FIG. 5, the procedure for performing an improved effective add operation according to the present invention is illustrated. As with the sequence illustrated in FIG. 2 beginning with step 210, the subsequent steps 211 and 212, the determination of DELTA E and the alignment of the fractions providing aligned fractions A and B, are the same. In the process of the present invention, the subsequent activity is the simultaneous execution of steps 513A and 513B. In step 513A, the (aligned) fractions A and B are divided by 2 and the resulting quantities, A/2 and B/2, and the rounding constant are added. Simultaneously in step 513B, the fractions A and B and the rounding constant are added together. Then in step 514, the result of the appropriate process result, i.e. the result of step 513A or 513B, is selected based on the presence or absence of an overflow bit from the process of step 513B.

Figure 6:
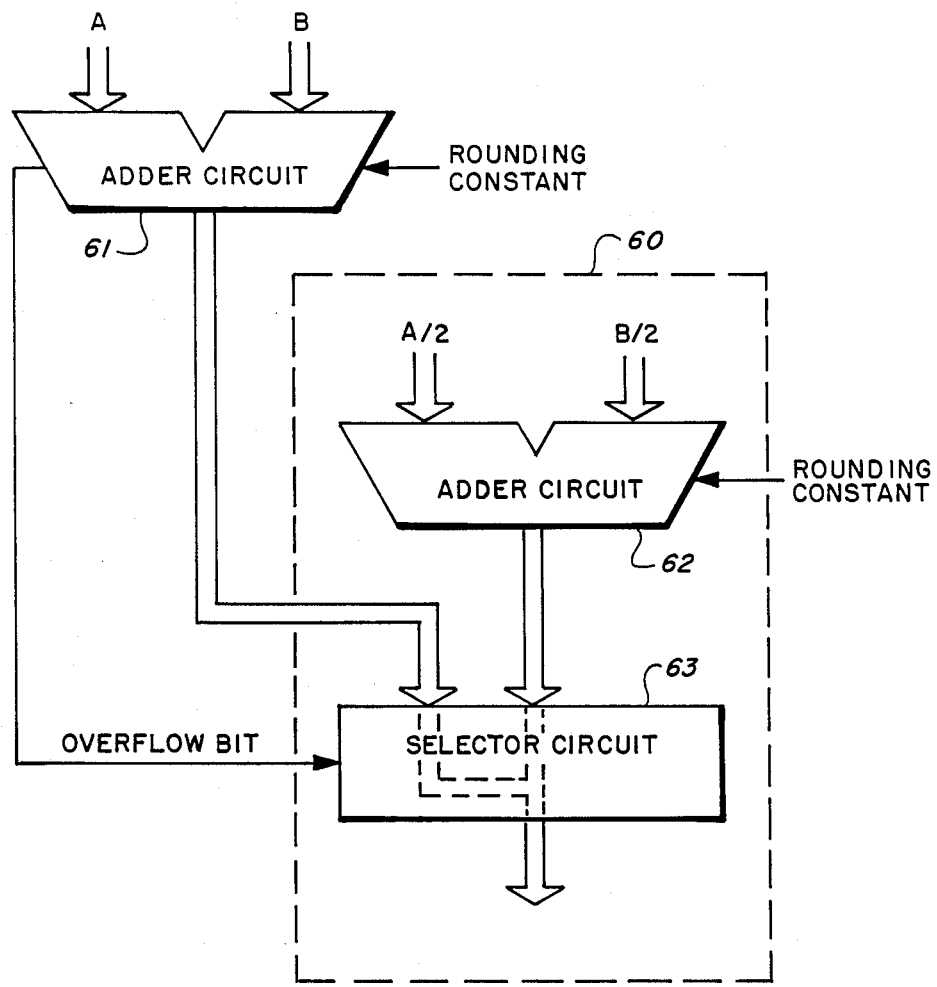
FIG. 6 is a block diagram of the additional apparatus required to implement the floating point effective addition operation according to the present invention.

Referring now to FIG. 6, the additional apparatus 60 required to implement the effective add operation of the present invention is shown. The results of the alignment operation, i.e. the fractions A and B, are applied to adder circuit 61 and, the same fractions, shifted by one position, i.e. the fractions A/2 and B/2, are applied to adder circuit 62. The addition operation is performed in each adder circuit simultaneously and, during this process, the rounding constant is applied to each adder circuit. The resulting quantities determined by each of the two adder circuits are applied to the selector circuit 63. Selector circuit 63 also receives an overflow signal from adder circuit 61. The presence of the overflow bit causes the result from adder circuit 62 to be utilized, while the absence of the overflow bit causes the result from adder circuit 61 to be selected.

Figure 7:
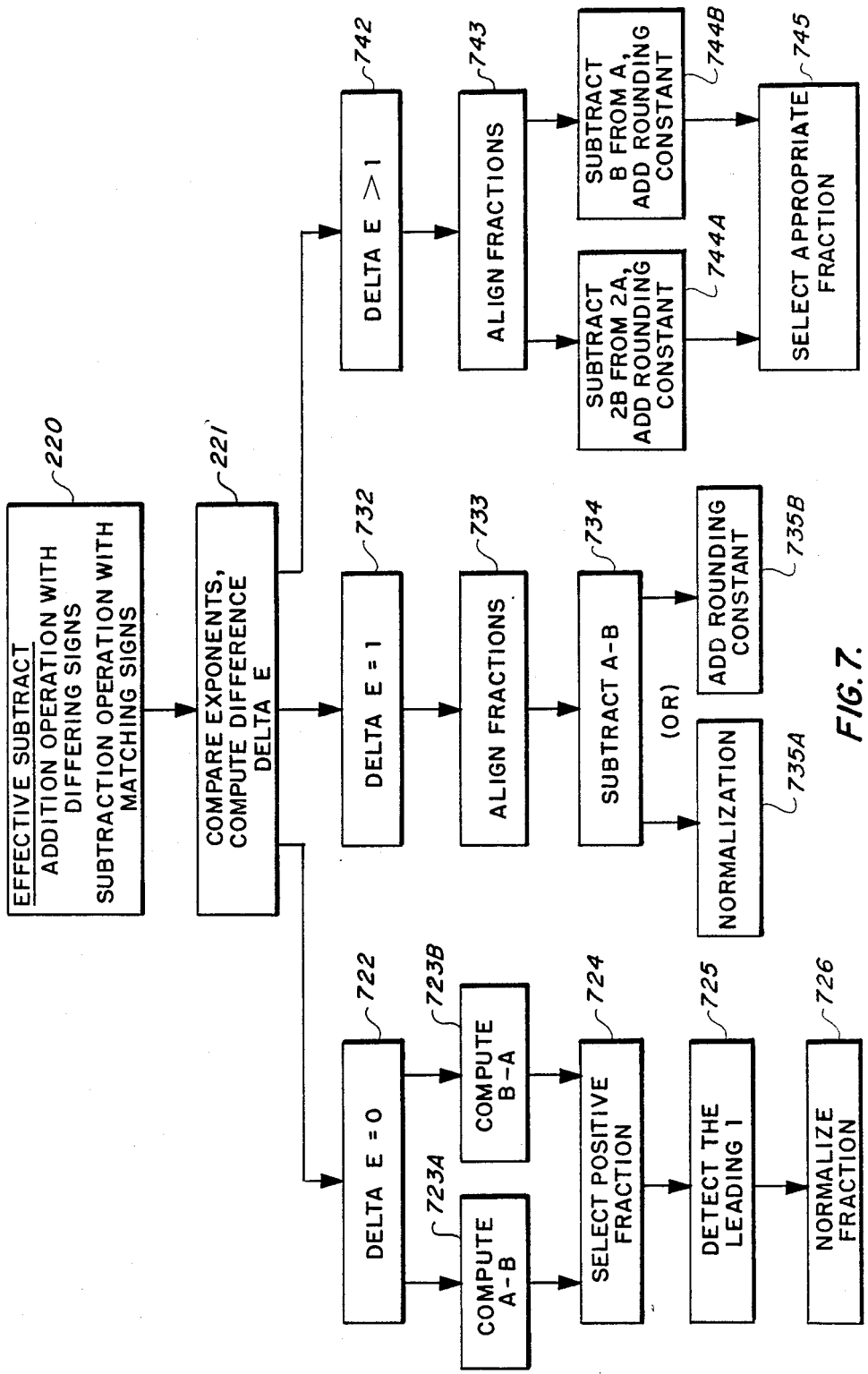
FIG. 7 is a flow diagram illustrating the floating point effective subtract operation according to the present invention.

Referring next to FIG. 7, the procedure according to the present invention for performing the floating point effective subtract operation is illustrated following the determination of the effective subtract operation in step 220. As with the procedure of the related art, the difference between the exponential values, DELTA E, is determined in step 221. The DELTA E value determines the remainder of the procedure. When DELTA E=O in step 722, no aligning step is necessary. However, the resulting difference can be negative, there is never a need to round the resulting quantity and a large normalization may be necessary. Because the resulting quantity can be negative, in order to expedite the effective subtract operation, two adders are used to compute simultaneously (A−B) in step 723A and (B−A) in step 723B. A selection circuit determines the correct quantity in step 724 by selecting the positive result using the overflow bit from step 723A. In the presence of the overflow bit, the selector circuit selects the result determined by step 723B. In the absence of the overflow bit, the selecting step 724 selects the result determined by step 723A. In step 725, the leading one in the resulting fraction selected in step 724 is identified and the quantity is normalized in step 726 based on the position of the leading one. In the second situation illustrated in FIG. 7 in which DELTA E=1, the alignment procedure requires a shift of one position for the fraction with the smaller exponent, a relatively rapid process. When the aligned fraction is subtracted from the normalized fraction, the resulting quantity is always positive. However, the resulting quantity must be sometimes rounded and a large normalization can be required. Because the aligning procedure requires only a single position shift, the use of a large shifter is not necessary. Rounding is required only in the case where no normalization is required. Therefore, referring to FIG. 7, the determination that DELTA E =1 in step 732 is followed by an (rapid) alignment step 733, and a subtraction step 734. Following the subtraction step 734, either the normalization step 735A or the rounding step 735B is implemented. Thus, the steps potentially requiring a lengthy execution interval are the determination of DELTA E in step 221, the subtraction in step 734 and either the normalization step 735A or the fraction rounding in step 735B. In the third situation illustrated in FIG. 7, DELTA E>1 is determined in step 721. The resulting quantity from this effective subtract situation will always be positive when the aligned fraction is subtracted from the normalized fraction. The resulting quantity may sometimes be rounded and the maximum normalization requires a shift of 1 position. Referring to FIG. 7, after DELTA E is identified to be greater than 1, in step 743, the quantities must be aligned. In step 744A, the quantity 2A−2B is determined in a first adder circuit and the rounding constant is combined during the process. Simultaneously, in step 744B, the quantity A−B is determined in a second adder circuit and the rounding constant combined therewith. In step 745, the overflow bit from the first adder circuit is used to select the correct result from the two adder circuits. If the overflow bit of step 744A is present, then the result determined by step 744B is selected. If the overflow bit is absent in step 744A, then the result determined by step 744A is selected.

Figure 8:
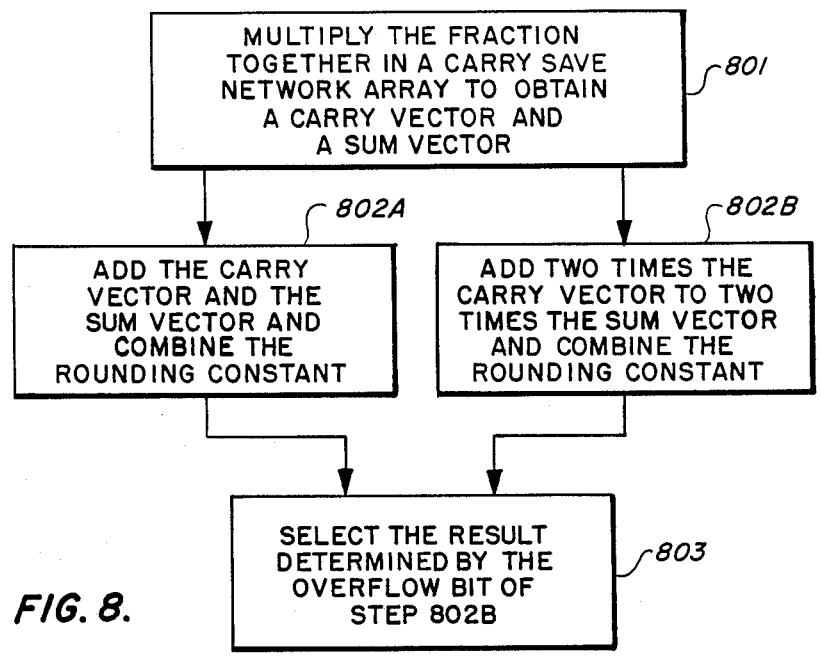
FIG. 8 is a flow diagram illustrating the fractin floating point multiplication operation according to the present invention.

Referring next to FIG. 8, the flow diagram for the improved floating point multiplication operation is illustrated. In step 801, the fractions are multiplied in the carry sum adder array to obtain a Sum vector and a Carry vector. In step 802A, the Carry vector and the Sum vector are added together and the rounding constant is combined therewith in a first adder circuit. Simultaneously, in step 802A, the quantity 2*(Carry vector) and 2*(Sum vector) are added together and the rounding constant is combined therewith in a second adder circuit. In step 803, the result from one of the adder circuits is selected based on the overflow bit from the second adder circuit of step 802B. If the overflow bit is present, then the sum determined by step 802A is used and is normalized. If the overflow bit is not present, then the sum determined by step 802B is selected as the final result.

Figure 9:
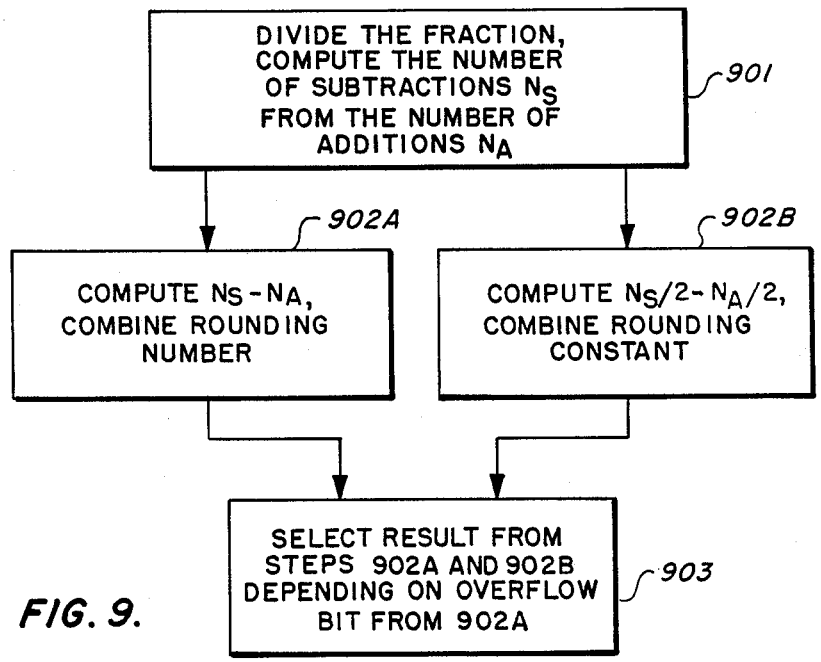
FIG. 9 is a flow diagram illustrating the fraction floating point division operation according to the present invention.

Referring next to FIG. 9, the procedure for performing the floating point division operation according to the present invention is illustrated. In step 901, the fractions are divided and the value for the number of subtractions, $N_S$, and the value for the number of negative subtractions, $N_A$, are determined. In step 902A, the value $N_S - N_A$ is determined and the rounding bit is combined during the operation. Simultaneously, in step 902B, the value of $N_S/2 - N_A/2$ is determined and the rounding constant combined therewith. In step 903, the result from either step 902A or step 902B is selected depending on the overflow bit of the operation performed in step 902A. If the overflow bit in step 902A is present, then the result determined by step 902B is selected. If the overflow bit is absent in step 902A, then the result determined by step 902A is selected.

OPERATION OF THE PREFERRED EMBODIMENT

Addition and Subtraction

Referring to FIG. 5, the procedure for performing the effective add operation according to the present invention is illustrated.

TABLE IB (Example of a revised effective add operation)

| Nonshifted operands (Step 513B) | | Shifted operands (Step 513A) | |
|---|---|---|---|
| A = 0.10001 | E = N | A/2 = 0.010001 | E = N + 1 |
| B = 0.10000 | E = N | B/2 = 0.0100001 | E = N + 1 |
| RC = 1 | | RC = | |
| R = 1.000011 | E = N | R = 0.100010 | E = N + 1 |

(Select shifted operand by the overflow bit of step 513B. In this example, the result from step 513A is selected.)

Figure 1:
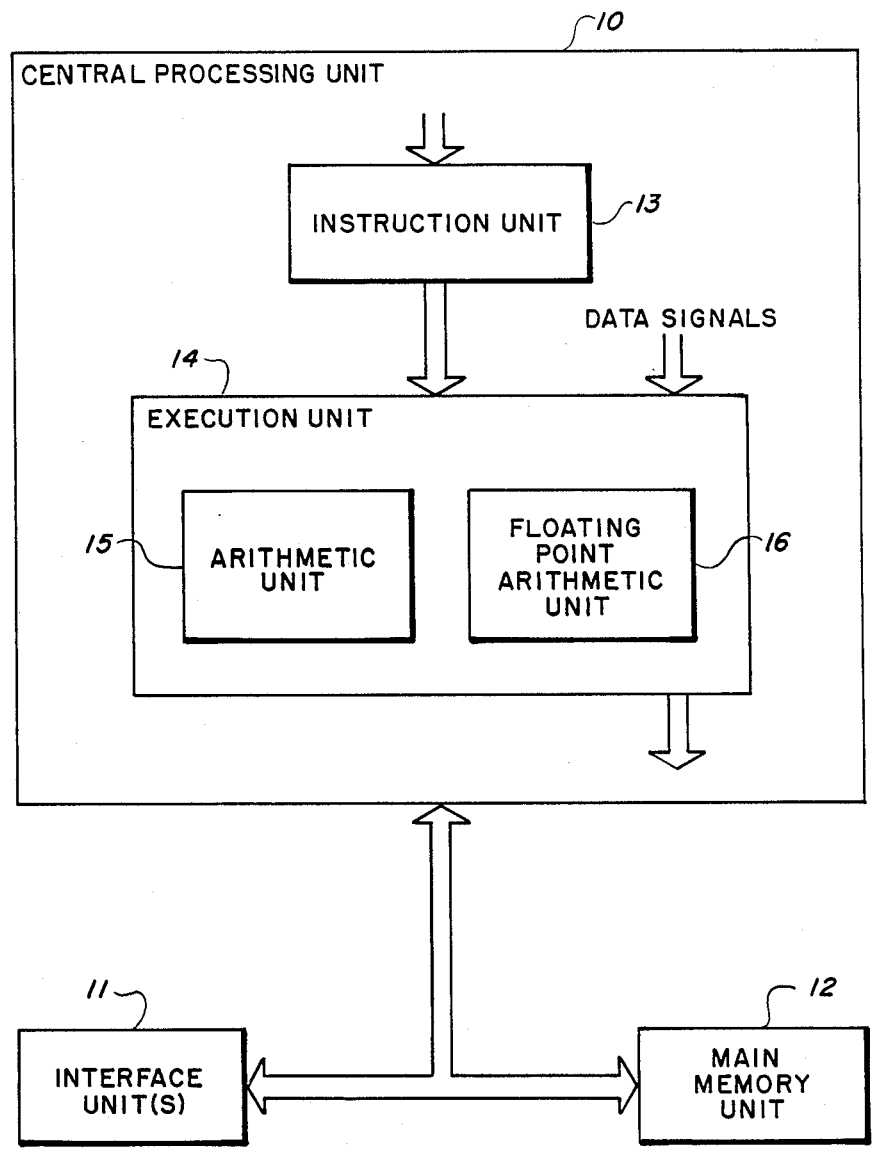
FIG. 1 is a block diagram of selected components of a data processing system.
Figure 2:
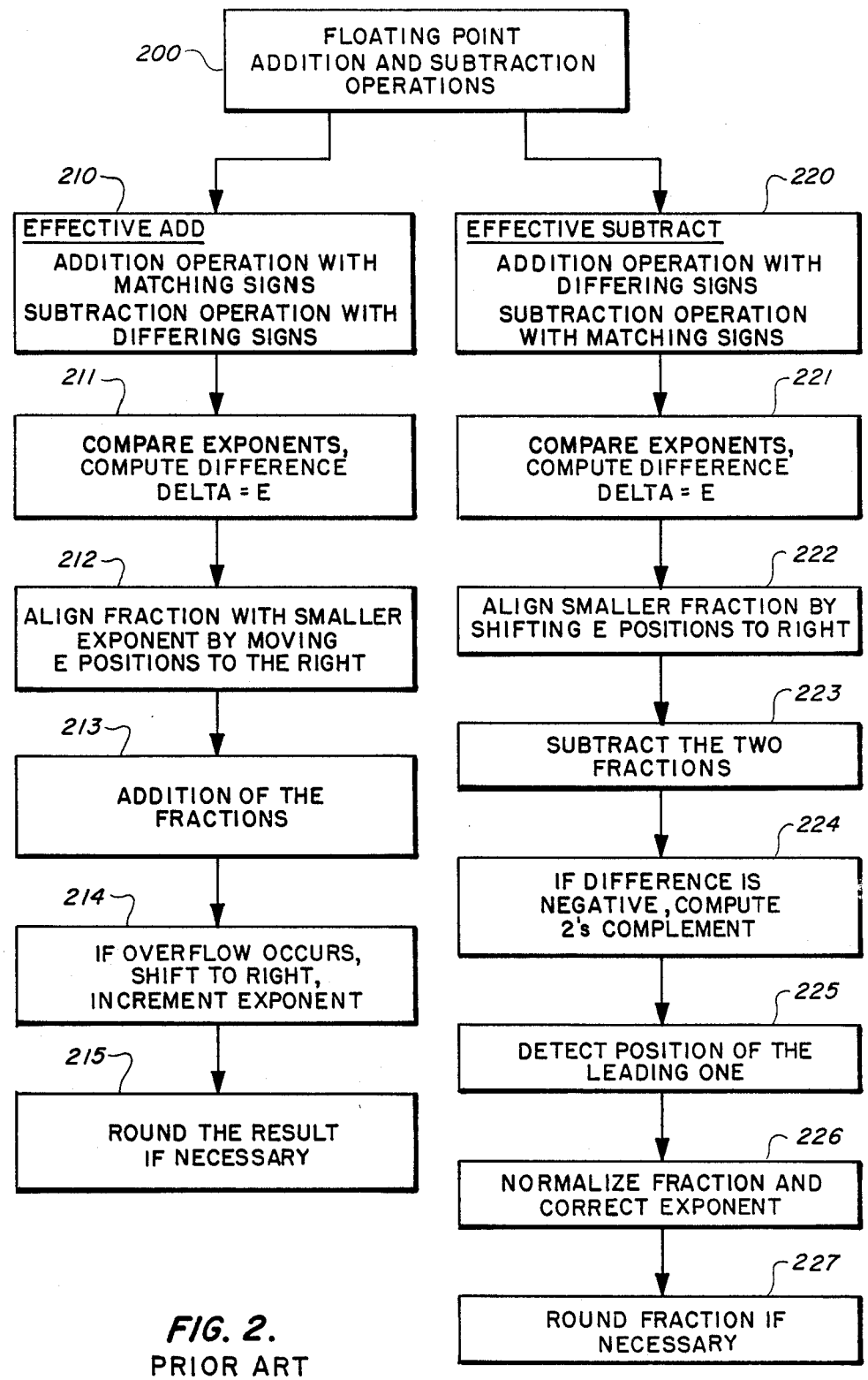
FIG. 2 is a flow diagram for the floating point operations of addition and subtraction according to the related art.
Figures 3, 4:
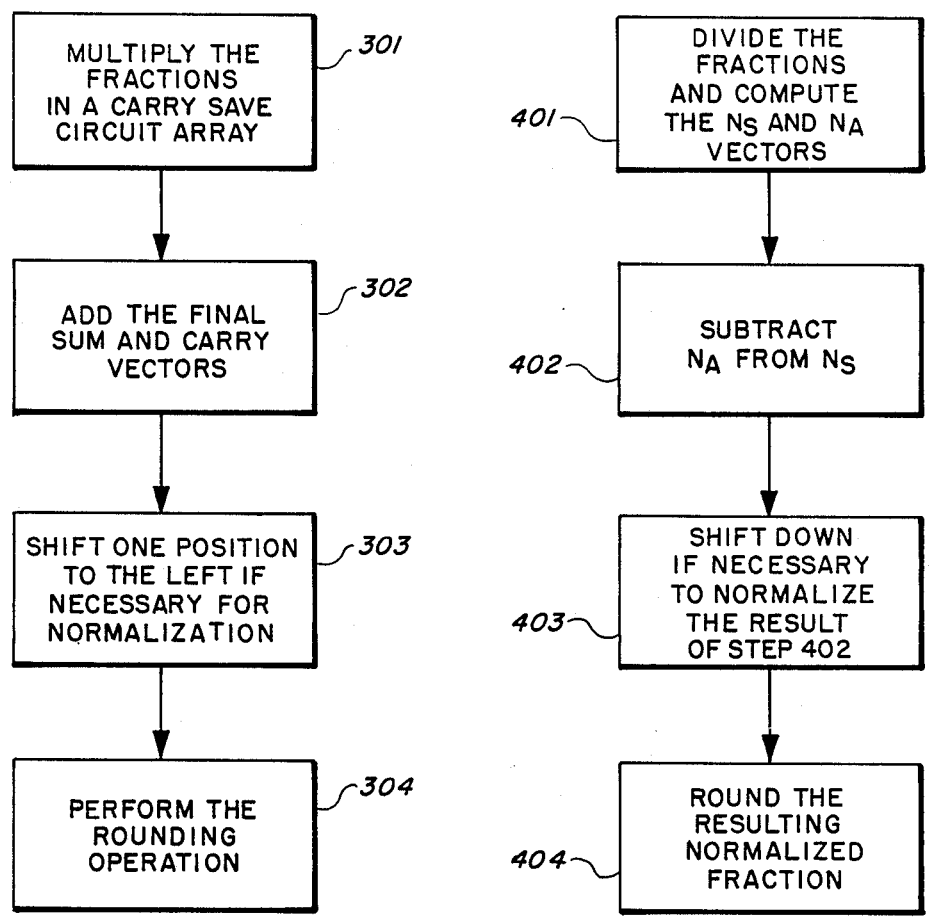
FIG. 3 is a flow diagram for the floating point operation of multiplication according to the related art.
FIG. 4 is a flow diagram for the floating point operation of division according to the prior art.

Comparing the flow diagram of FIG. 2 with the flow diagram of FIG. 5, by providing parallel processing in which the rounding process can be incorporated in the addition process, a potentially lengthy step can be eliminated and the execution of the effective add operation expedited.

In the floating point effective subtract operation of the present invention, when DELTA E = O, as will be clear to those skilled in the art, only three potentially lengthy steps are involved, the symmetric subtract operation, the leading 1 detection, and the normalization. In particular, the alignment step, the negation (2's complement) step and the rounding steps have been eliminated or are not required. Similarly, in the situation where DELTA = 1, three potentially lengthy steps are required for execution of the effective subtract operation. In the situation where DELTA > 1, three potentially lengthy process steps can provide the requisite floating point effective subtract operation. Thus, the effective subtract operation can in general be performed in three potentially lengthy steps as opposed to seven potentially lengthy steps as the operation is performed in the related art. To achieve this economy of time, an additional adder is needed and a selector circuit. In addition, the subinstructions implementing the steps are more complex, responding to a determination as to the value of DELTA E.

The use of the processes of the present invention have been estimated to provide a reduction in the execution of the floating point operations of addition and subtraction operations in excess of 25%.

Multiplication

For the floating point operation, the effort expended on the core process of multiplying has resulted in the execution bottleneck being shifted to the remaining or terminal processes. In the procedure of the present invention, the two full carry propagation additions of the related art are replaced by the simultaneous execution of two processes, one of which will be the correct result of the computation. It is estimated that the implementation of the present invention will decrease the execution time for the floating point multiplication operation by an amount that can, in certain situations, be as high as 25%.

Division

A great amount of effort has been expanded in developing the techniques to provide the quotients of the fractions expeditiously. Although tremendous improvement in this process has been achieved, the quotient developement remains the principal execution bottleneck for the floating point division operation. However, the remaining portion of the operation has a significant impact on the time required for the operation. By performing the two subtractions in parallel and then selecting the appropriate result based on the overflow bit as opposed to a serial process of normalizing and rounding, the execution time for the operation has estimated to be reduced, in certain situations, by as much as 10%.

It will be clear that the apparatus illustrated in FIG. 6 is generally applicable to all the situations of the present invention in which the floating point arithmetic operations can be expedited by parallel processing. In the present invention, the operations are expedited in the terminal portion of the operation as opposed to the core data manipulation portion. Thus in several instances, the rounding constant can be combined prior to an actual determination of whether the calculated quantity must be normalized. Furthermore, the use of normalized quantities can place limits on the departure from normalization of the values resulting from execution of the floating point arithmetic operations.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for executing a floating point arithmetic operation on floating point operands, each floating point operand including a plurality of floating point operand portions, said apparatus comprising:
   arithmetic logic means for performing an arithmetic operation on a first portion of a first floating point operand and a first portion of a second floating point operand to provide at least a first intermediate result, wherein said arithmetic operation is determined by an executing floating point arithmetic operation;
   first adder means for combining at least two intermediate operands, wherein said executing operation selects when said two intermediate operands are said first intermediate result and a second intermediate result and when said two intermediate operands are a second portion of said first floating point operand and a second portion of said second floating point operand, said first adder means further combining a rounding signal with said two intermediate operands for a predetermined executing operation;

second adder means for combining simultaneously with first adder means said at least two intermediate operands wherein each of said intermediate operands has been multiplied by a scaling factor, said scaling factor determined by said executing operation, said second adding means further combining a rounding constant with said two intermediate operands multiplied by a scaling factor for said predetermined executing operation; and selection means for selecting a first adder means result operand or a second adder means result operand, said executing operation determining when said selection means is controlled by a signal from a one of said first and second adder means and when said selection means is controlled by a signal from said arithmetic means.

2. The apparatus for executing a floating point arithmetic operation of claim 1 wherein said executing floating point operation is a floating point effective addition operation, said arithmetic logic means operation including aligning a fraction portion of a floating point operand to provide portion A with a fraction portion B of a floating point operand having a larger exponential portion, said second adder means adding portion A/2 and portion B/2 along with said rounding constant, said first adder means adding portion A and portion B along with said rounding constant, said selection means responsive to an overflow bit from said first adder means to select said first adder means result operand or said second adder means result operand.

3. The apparatus for executing a floating point arithmetic operation of claim 10 wherein said executing floating point operation is a floating point effective subtraction operation, wherein said arithmetic logic means operation determines an absolute difference value E between an exponential portion of a first and a second floating point operand, wherein execution of said effective subtraction operation has three subexecution sequences depending on when $E=O$, $E=1$ and $E>1$.

4. The apparatus for executing a floating point arithmetic operation of claim 3 when $E=O$ for said floating point effective subtraction operation, wherein said first adder means subtracts a fraction portion of said second floating point operand from a fraction portion of said first floating point operand, said scaling factor for said second adder means being $-1$, wherein said selection means is responsive to a signal from said first adder means.

5. The apparatus for executing a floating point arithmetic operation of claim 3 when $E>1$ for said floating point effective subtraction operation, wherein said arithmetic logic means operation includes aligning a fraction portion of a floating point operand to provide a fraction portion B with a fraction portion A of a floating point operand having a larger exponential portion, said second adder means subtracting two times portion B from two times portion A while adding said rounding constant thereto, said first adder means subtracting portion B from portion A while adding said rounding constant thereto, wherein said selection means is responsive to a signal from said second adder means.

6. The apparatus for executing a floating point arithmetic operation of claim 1 wherein said executing floating point operation is a multiplication operation, wherein said arithmetic logic unit includes a carry save multiplication configuration, wherein said carry save multiplication configuration provides a carry operand and a sum operand in response to a fraction portion of a first floating point operand and a fraction portion of a second floating point operand being applied thereto, said first adder means adding said carry operand and said sum operand along with said rounding constant, said second adder adding two times said carry operand and two times said sum operand along with said rounding constant, said selection circuit responsive to a overflow signal from said second adder means.

7. The apparatus for executing a floating point arithmetic operation of claim 1 wherein said executing floating point operation is a division operation, wherein said arithmetic logic unit includes a subtraction/addition configuration for determining a result of dividing a fraction portion of a first floating point operand by a fraction portion of a second floating point operand using a "non-restoring" procedure, said "non-restoring" procedure including determining a number of addition suboperations and a number of subtraction operations to complete said "non-restoring" procedure, wherein said result of dividing is determined by subtracting a number of addition suboperations from a number of subtraction suboperations, wherein said number of addition suboperations and said number of subtraction suboperations are intermediate result operands from said arithmetic logic means, wherein said first adder means subtracts said number of additions operand from said number of subtractions operand while adding said rounding constant, said second adding means subtracting one half said number of additions operand from one half said number of subtractions operands, said selection means responsive to an overflow signal from said first adder means.

8. A method of executing a floating point operation involving a plurality of floating point operands, said floating point operands having a plurality of operand portions, said method comprising:

performing an arithmetic logic operation on said floating point operands determined by said executing floating point operation, said arithmetic logic operation providing two intermediate operands;

simultaneously executing an addition/subtraction operation on said two intermediate operands while executing said addition/subtraction operation on said two intermediate operands each multiplied by a constant, wherein said addition/subtraction operation and said constant are determined by said executing floating point operation;

adding a rounding constant during said addition/subtraction operations for a predetermined executing floating point operation; and selecting a result operand from one of said addition/subtraction operations determined by results of a previous operation, wherein said previous operation is determined by said executing floating point operation.

9. The method of executing a floating point operation of claim 8 wherein said executing floating point operation is an effective addition operation wherein said performing step includes a step of providing a fraction portion A by aligning a fraction portion of a first floating point operand with a fraction portion B of a second floating point operand having a larger exponential portion, said fraction portion A and said fraction portion B being said intermediate operands; wherein said simultaneously executing step includes a step of adding fraction portion A/2 and fraction portion B/2 simultaneously with adding fraction portion A and fraction portion B; said effective addition floating point operation being a predetermined operation; and wherein said selecting step includes selecting a result operand in response to an overflow event in said adding said fraction portion A and said fraction portion B operation.

10. The method of executing a floating point operation of claim 8, wherein said executing floating point operation is an effective subtraction operation, wherein said performing step includes a step of determining when an absolute value of the difference between two exponential portions of said floating point operands is equal to zero, equal to one and greater than one.

11. The method of executing a floating point effective subtraction operation of claim 10 when said absolute value is equal to zero, wherein said simultaneously executing step includes subtracting a fraction portion of a first floating point operand from a fraction portion of a second floating point operand and subtracting said second operand fraction portion from a first operand fraction portion; and wherein said selecting step includes a step of selecting a positive operand resulting from a one of said simultaneously executing subtracting operations.

12. The method of executing a floating point effective subtraction operation of claim 10 when said absolute value is greater than one, said performing step further including a step of providing a fraction portion B by aligning a fraction portion of a first floating point operand with a fraction portion A of second floating point operand having a greater exponential portion, said simultaneously executing step including subtracting a fraction portion 2B from a fraction portion 2A and subtracting a fraction portion B from a fraction portion A, wherein said effective subtraction operation with said absolute value of the difference in exponents greater than one is a predetermined floating point operation, and wherein said selecting step selects a result operand as a result of an overflow signal from said subtracting operation of said fraction portion 2B from fraction portion 2A.

13. the method of executing a floating point multiplication operation of claim 8 wherein said performing step includes the step of multiplying a fraction portion of a first floating point operand with a fraction portion of a second floating point operand using a carry save technique, said carry save technique providing a carry operand and a sum operand, wherein said simultaneously executing step includes adding said sum operand and said carry operand and adding two times said sum operand and two times said carry operand, wherein multiplication is a predetermined floating point operation, said selecting step includes determining a final result in response to an overflow signal from an addition operation of two times sum operand and two times carry operand.

14. The method of executing a floating point division operation of claim 8 wherein said performing step includes a step of dividing a fraction portion of a first floating point operand by a fraction portion of a second floating point operand using a series of addition and subtraction operations, said addition/subtraction operations providing a number of subtraction $N_S$ operand and a number of additions $N_A$ operand, wherein said simultaneously executing step includes subtracting said $N_A$ operand from said $N_S$ operand and subtracting an $N_A/2$ operand from an $N_S/2$ operand, said dividing floating point operation being a predetermined operation, wherein said selecting step includes selecting a result operand from an overflow condition of a subtracting operation of said $N_S$ and $N_A$.

15. A floating point arithmetic unit for providing an arithmetic operation of floating point operands, each said floating point operand including operand portions, said unit comprising:

arithmetic logic means for preparing two intermediate operands from fraction portions of two floating point operands in response to a floating point arithmetic operation being executed;

first and second adder means, said first adder means for combining said intermediate operands while said second adder means concurrently combines said intermediate operands each multiplied by a constant value, wherein said first and second adder means are responsive to predetermined executing floating point operation for further combining a rounding constant; and selection means for selecting a result operand from said first or said second adder means in response to an overflow signal from a one of said first and said second adder means.

16. A floating point arithmetic unit of claim 15 wherein said executing floating point operation is an addition floating point operation, wherein said intermediate operands are aligned fraction operand portions, said first adder means adding said two aligned fraction operands and said rounding constant, said second adder meand adding said two aligned fraction operands multiplied by a one half constant value and adding thereto said rounding constant, wherein said selection means is responsive to an overflow result from said first adder means.

17. A floating point arithmetic unit of claim 15 wherein said executing floating point operation is a subtraction floating point operation; wherein said arithmetic logic means determines an absolute value of a difference between exponential operand portions of two floating point operands, said subtraction floating point operation depending on a value of said absolute difference; wherein said absolute difference value can be zero, one and greater than one.

18. A floating point arithmetic unit of claim 17 wherein said executing floating point operation is a subtraction floating point operation and said absolute difference value is greater than one, wherein said arithmetic logic means provides two aligned fraction operand portions as intermediate operands, said first adder subtracting the smaller fraction portion from the larger fraction portion and adding said rounding constant, said second adder means subtracting two times said smaller fraction portion from two times said larger fraction portioon and adding said rounding constant, wherein said selection means selects a result operand in response to an overflow result from said second adder means.

19. A floating point arithmetic unit of claim 15 wherein said executing floating point operation is a multiplication floating point operation, said intermediate operands being a carry operand and a sum operand from a carry save multiplication operation, said first adder means adding said carry operand and said sum operand along with a rounding constant, said second adder means adding said carry operand multiplied by two and said sum operand multiplied by two along with said rounding constant, said selection means determining a result operand from an overflow condition in said second adder means.

20. A floating point arithmetic unit of claim 15 wherein said executing floating point operation is a division floating point operation, said arithmetic logic means performing a "non-restoring" division algorithm, said intermediate operands being $N_S$ operand identifying a number of subtraction operations and an $N_A$ operand identifying a number of addition operations resulting from said "non-restoring" division process, wherein said first adder means subtracts said $N_A$ operand from said $N_S$ operand while adding said rounding constant, said second adder means subtracting an $N_A/2$ operand from said $N_S/2$ operand while adding said rounding constant, said selection means selecting said result operand in response to an overflow condition in said first adder means.

* * * * *